(12) United States Patent  (10) Patent No.: US 8,671,583 B2
Leonard  (45) Date of Patent: Mar. 18, 2014

(54) ALIGNMENT DEVICE (76) Inventor: Cathal Leonard, Dublin (IE)

( * ) Notice: Subject to any disclaimer, the term of this patent is extended or adjusted under 35 U.S.C. 154(b) by 233 days.

(21) Appl. No.: 13/062,270

(22) PCT Filed: Aug. 28, 2009

(86) PCT No.: PCT/EP2009/061175
§ 371 (c)(1),
(2), (4) Date: Apr. 21, 2011

(87) PCT Pub. No.: WO2010/026117
PCT Pub. Date: Mar. 11, 2010

(65) Prior Publication Data
US 2011/0185585 A1  Aug. 4, 2011

(30) Foreign Application Priority Data
Sep. 5, 2008 (GB) ................................ 0816184.6

(51) Int. Cl.
G01C 9/06 (2006.01)
G01B 5/24 (2006.01)

(52) U.S. Cl.
USPC ............................................... 33/379; 33/533

(58) Field of Classification Search
USPC ............ 33/370, 347, 526, 527, 371, 383, 374
See application file for complete search history.

(56) References Cited

U.S. PATENT DOCUMENTS

| 1,848,003 | A | | 3/1932 | Chalupny |
| 1,941,404 | A | | 12/1933 | Lansing |
| 4,126,944 | A | * | 11/1978 | Burkhart ........................ 33/347 |
| 4,168,578 | A | * | 9/1979 | VanderWerf .................... 33/371 |
| 4,208,802 | A | * | 6/1980 | Berndt ............................ 33/347 |
| 4,228,982 | A | * | 10/1980 | Sellera ........................... 33/370 |
| 4,447,481 | A | * | 5/1984 | Holmberg et al. ........... 428/41.7 |
| 4,583,343 | A | | 4/1986 | Camp |
| 4,888,875 | A | * | 12/1989 | Strother ......................... 33/347 |
| 4,989,332 | A | * | 2/1991 | Worrallo ........................ 33/342 |
| 5,063,679 | A | * | 11/1991 | Schwandt ...................... 33/347 |
| 5,339,530 | A | * | 8/1994 | Wright ........................... 33/427 |
| 5,647,139 | A | * | 7/1997 | Richardson .................... 33/608 |
| 5,669,258 | A | * | 9/1997 | Luebke .......................... 33/379 |
| 5,956,855 | A | * | 9/1999 | Foss et al. ...................... 33/391 |
| 6,138,369 | A | * | 10/2000 | Mushin .......................... 33/379 |
| 6,434,848 | B1 | * | 8/2002 | Gordon et al. ................. 33/528 |
| 6,694,632 | B1 | * | 2/2004 | Schooley ........................ 33/374 |
| 6,912,794 | B2 | * | 7/2005 | Hannah .......................... 33/404 |
| 7,013,570 | B2 | * | 3/2006 | Levine et al. .................. 33/286 |
| 7,070,667 | B1 | | 7/2006 | Kirby |
| 7,216,841 | B2 | * | 5/2007 | Dodig, Jr. ................. 248/475.1 |
| 7,278,218 | B2 | * | 10/2007 | Levine .......................... 33/286 |
| 7,367,129 | B2 | * | 5/2008 | Lu .................................. 33/286 |
| 7,506,450 | B2 | * | 3/2009 | Spaulding et al. ............. 33/286 |
| 7,530,174 | B1 | * | 5/2009 | Kimball et al. ................ 33/373 |

(Continued)

FOREIGN PATENT DOCUMENTS

AT  413229 B  12/2005
FR  2322354 A1  3/1977

(Continued)

Primary Examiner — Yaritza Guadalupe-McCall
(74) Attorney, Agent, or Firm — Seyfarth Shaw LLP; Brian Michaelis (57) ABSTRACT An alignment device which comprises an alignment member, and a measuring mechanism for measuring the orientation of the alignment member. The measuring mechanism is retained by the alignment member.

43 Claims, 4 Drawing Sheets

(56) References Cited

U.S. PATENT DOCUMENTS

| | | |
|---|---|---|
| 7,685,724 B2 * | 3/2010 | Spaulding et al. ............... 33/286 |
| 7,708,252 B2 * | 5/2010 | Vander Berg et al. ......... 248/544 |
| 7,927,450 B2 * | 4/2011 | Spaulding et al. ............. 156/289 |
| 7,946,051 B1 * | 5/2011 | Hannah et al. .................. 33/613 |
| 2001/0049879 A1 * | 12/2001 | Moore, Jr. ........................ 33/376 |
| 2002/0073565 A1 * | 6/2002 | Schooley ......................... 33/374 |
| 2003/0061720 A1 * | 4/2003 | Waibel ............................ 33/281 |
| 2004/0140413 A1 * | 7/2004 | Dodig, Jr. .................... 248/475.1 |
| 2004/0187327 A1 * | 9/2004 | Levine ............................ 33/286 |
| 2004/0206027 A1 | 10/2004 | Steele |
| 2005/0109910 A1 * | 5/2005 | Vander Berg et al. ......... 248/477 |
| 2005/0274029 A1 | 12/2005 | Kavounas |
| 2008/0203266 A1 * | 8/2008 | Gallien ........................... 33/379 |
| 2011/0079693 A1 * | 4/2011 | Burkman ..................... 248/224.8 |
| 2011/0138642 A1 * | 6/2011 | Norelli ............................ 33/371 |
| 2012/0137530 A1 * | 6/2012 | Yun ................................. 33/370 |
| 2012/0240419 A1 * | 9/2012 | Wagner ........................... 33/760 |

FOREIGN PATENT DOCUMENTS

| | | |
|---|---|---|
| GB | 2253878 A | 9/1992 |
| GB | 2451272 A | 1/2009 |
| WO | 02/10672 A | 2/2002 |
| WO | 03/031909 A2 | 4/2003 |

* cited by examiner

ALIGNMENT DEVICE

FIELD OF THE INVENTION

The present invention relates to an alignment device, in particular, but not exclusively, to an alignment device suitable for use in the art of tiling, to aid the alignment of tiles as they are applied to a wall.

BACKGROUND

To ensure alignment of tiles during the tiling of a wall, it is common in the art of tiling to fix an alignment member, such as a strip of wood, to the wall to provide a reference line. The strip of wood, may, for example, be fixed in a horizontal orientation so as to provide a horizontal reference line. Each tile is applied to the wall so as to abut one of its edges with the edges of the strip that defines the horizontal reference line. Thus, a series of applied tiles will align horizontally.

In many cases the strips of wood provide an inadequate reference line due to indentations or irregularities located on the strip's surface, or due to warping or natural curvature along the strip's length.

To fix the alignment member to the wall, fastening elements such as nails or screws, are usually used. Nails and screws penetrate the wall and will leave holes behind in the wall after the alignment member has been removed. The wall is left vulnerable to dampness as a result of these holes.

A further disadvantage is that nails or screws may penetrate electrical cables, pipes and other materials that lie behind the wall, as they penetrate into the wall.

It is difficult to connect an alignment member, such as a strip of wood, to a structure, such as a wall, in a specified orientation (e.g. a horizontal orientation) along its entire length. To do so requires a person to, (i) hold a device capable of measuring orientation, such as a spirit level, in place; (ii) guide the alignment member into the required orientation by referencing the device; and (iii) operate a hammer or screw driver, while at the same time holding the alignment member in position. In practice more than one pair of hands is required to carry out such an operation with any reasonable degree of ease. Furthermore, indentations or irregularities on the surface of the wooden strip may interfere with referencing to the device, making it even more difficult to align and attach the alignment member in a horizontal orientation.

If nails or screws are used to fix the alignment member to wall, it becomes increasingly difficult for the person to hold the alignment member in the desired position as these nails or screws are hammered/screwed through the alignment member.

There is therefore a need for an alignment device which addresses at least some of the drawbacks of the prior art.

SUMMARY

These and other problems are addressed by providing an alignment device which includes an alignment member and a measuring mechanism.

Accordingly, a first embodiment of the invention provides an alignment device as detailed in claim 1. The invention also provides a measuring mechanism as detailed in claim 31. Furthermore, the invention relates to an alignment member as detailed in claim 32. Additionally, the invention relates to a Kit as detailed in claim 33. Advantageous embodiments are provided in the dependent claims.

According to a first aspect of the present invention there is provided an alignment device comprising, an alignment member, and
a measuring mechanism for measuring the orientation of the alignment member,
wherein the measuring mechanism is retained by the alignment member.

An advantage of the alignment device is that, because the measuring mechanism is retained by the alignment member, a person operating the alignment device is not required to hold the measuring mechanism whilst at the same time guiding the alignment member into the required orientation whilst referencing the measuring mechanism. This permits one-handed operation of the device. Therefore, the device is preferably arranged for one-handed operation.

The above-mentioned device is easier to set-up than existing alignment devices. As the measuring mechanism is retained by the alignment member, a person operating the device can both hold the device and bring it into the correct orientation by referencing the measuring mechanism using one hand, thereby leaving the other hand free to operate tools such as hammers or screw drivers, to secure the alignment member.

An alignment member is any member that is capable of providing a reference line on a structure (such as a wall) to which one can align objects (e.g.:—tiles; slabs; natural stone; stone cladding; glass; wooden panels or strips; and metal, plastics, vinyl, fabric or leather wall panels). The reference line may be orientated horizontally, vertically, or orientated at any angle. More preferably the alignment member is any member that is capable of providing at least one of a horizontal or vertical reference line. Most preferably the alignment member is any member that is capable of providing a horizontal reference line. The reference line provided by the alignment member may be used, for example, to aid in arranging objects into a horizontal line. The alignment member may be an elongate member. The alignment member may, for example, be an elongate member comprising or consisting of, plastic, metal, wood or any other suitable material. The alignment member may be a laser. A vertical reference line may be further provided, optionally, by a laser.

The alignment member may be at least one of a straight member, curved member, zig-zag member or a member with any other shape, aspect or design that would be used for guiding objects into a particular orientation. Preferably the alignment member is a straight member such as, for example, a straight strip of, plastic, metal, wood or any other suitable material. A straight alignment member is suitable for use, for example, on a straight wall, when trying to align objects on the straight wall. A curved alignment member is suitable for use, for example, on a curved wall such as a curved corner, when trying to align objects on the curved wall. A zig-zag alignment member is suitable for use when aligning tiles in a "diamond" formation, but with a horizontal axis of symmetry in a horizontal orientation.

The "orientation" means the position of a given object, preferably the position with reference to the angle at which the object is positioned. For example a horizontal orientation is one where the object is positioned so as to be parallel with the floor (assuming the floor is level), and a vertical orientation may be the position of an object when it is parallel with the plumb line.

"Align" or "Alignment" means the act of adjusting to a line or the arrangement into a line. The line may be in any orientation. Preferably, the line is in a horizontal or vertical orientation. The line may be straight, curved, zig-zag or any other shape, aspect or design that would be used for guiding objects into a particular orientation. Preferably the line is a straight line. For example, aligning one or more tiles can be the act of arranging the one or more tiles such that they are in a straight horizontal line.

The measuring mechanism is a mechanism that is suitable for measuring orientation and optionally also length. The measuring mechanism may be any mechanism that is suitable for measuring the orientation of the alignment member. The measuring mechanism may be a mechanism capable of measuring the orientation of the alignment member relative to a target orientation, i.e. a vertical and/or horizontal orientation.

The measuring mechanism may be any one or a combination of those selected from the group consisting of a spirit level, a laser line level, a digital level device, or a measuring device that uses an infra red sensor, ultrasound, or a light emitting diode-based transmitter. Preferably the measuring mechanism is a spirit level. The measuring mechanism may be further capable of measuring length, for example the measuring mechanism may be capable of determining the length and so the centre of a structure such as a wall. This may be achieved by the use of a laser, such as, for example, a laser whose operation is based on the time-of-flight principle. Such a laser will comprise a timer, a transmitter and a receiver. The laser will transmit light, the transmitted light is directed towards an object and is reflected from that object towards the receiver of the laser. The reflected light is detected by the receiver. The timer will determine the time it takes for the transmitted light to travel from the transmitter to the object and back to the receiver. This period of time is directly proportional to the distance travelled. Knowing the speed at which the light travels, the distance from the laser to the object can be calculated.

Most preferably the measuring mechanism may comprise a spirit level (e.g for measuring orientation) and a laser (e.g. for determining the length and/or centre of a structure). The part of the measuring mechanism that is capable of measuring orientation may be separate from the part capable of measuring length, but both parts are retained by the alignment device.

The person of ordinary skill would understand that the term "retain" is synonymous with "hold"; and encompasses the terms, "integral to", "movably retained" and "releasably retained". Thus, an alignment member that retains the measuring mechanism, is an alignment member in which the measuring mechanism is integral to the alignment member or, moveably retained by the alignment member and/or releasably retained by the alignment member.

To moveably retain the measuring mechanism is to retain the measuring mechanism by the alignment member such that the measuring mechanism may move. For example, the alignment member may retain the measuring mechanism in such a manner that allows the measuring mechanism to move, preferably slide, along the length of the alignment member (or a portion thereof) and/or to rotate (preferably around its central axis).

To releasably retain is to retain in a manner that allows the measuring mechanism to be released from retention and preferably to allow repeated cycles of retaining and releasing. This will allow the person to reuse the same measuring mechanism with other, similar, alignment members.

The measuring mechanism may be retained by the alignment member at any point along its length, e.g. by locating part of the measuring mechanism in a track that permits the insertion or removal of the measuring mechanism from the track by the application of pressure. Alternatively the measuring mechanism may be releasably retained at distinct points on the alignment member. The measuring mechanism may be slideable along the track, ensuring that the measuring mechanism is moveably retained. This manner of retaining will allow the measuring mechanism to be moved to different points along a length of the alignment member, so as to permit the orientation of different portions of the alignment member to be measured.

The measuring mechanism may be integral to the alignment member, in which case the measuring mechanism forms part of the alignment member and may not be removed from, or moved relative to points on, the alignment member.

Preferably, the measuring mechanism is moveably retained and releasably retained by the alignment member. This may be of particular advantage where an alignment device extends into a difficult to reach area. The measuring device may be attached to the alignment member so as to be retained at an easily accessible portion of the alignment member, and then moved whilst still being retained, to an inaccessible portion of the alignment device.

The measuring mechanism may be releaseably and/or movably retained by the alignment member by means of a male-female coupling member (e.g. a snap-fastener), with complimentary partners of each coupling member being located on the alignment member and measuring mechanism.

The alignment member may comprise a recessed area with a retaining member that defines a recessed area with an access aperture (female) to facilitate the engagement of the measuring mechanism and alignment member such that the measuring mechanism is retained by the alignment member. The recessed area and access aperture may be an elongate recess area with an aperture that runs the length, or a portion thereof, of the alignment mechanism, thereby forming a track.

A carriage member (male) provided on the measuring mechanism can be forced into the recessed area through the access aperture provided on the alignment member and retained unless removed under pressure. The width of the carriage member is preferably greater than that of the access aperture. The arrangement of the access aperture may be such that the measuring mechanism is retained by the alignment member when the carriage member(s) of the measuring mechanism are positioned within the recessed area.

The measuring mechanism may comprise more that one carriage member, for example two carriage members, that are suitable for positioning within the recessed area of the alignment member. More preferably the measuring mechanism comprises at least two carriage members that are suitable for positioning within the recessed area of the alignment member.

When the access aperture is an elongate aperture that runs substantially the length of the alignment member the alignment member is able to retain the measuring mechanism at any point along its length, and after being retained allow movement of the measuring mechanism along the length of the alignment member.

The elongate access aperture may be further provided with an access point located proximate to at least one end of the aperture. The access point is configured such that the carriage member can slide into the recessed area through the access point without the application of pressure. The carriage member preferably fits through the access point. The access point can be located proximate to at least one end of the track of the alignment member. Preferably, the alignment member is further provided with access points located proximate to both ends of the alignment member.

In cross-section, the retaining member may have a "c" shaped profile wherein the cavity of the "c" defines the recessed area, and the gap between the ends of the "c" define the access aperture.

The alignment member may comprise a platform and a body. The body of the alignment member has a first surface configured to substantially abut with a surface of a structure (such as a wall) against which one wants to set a reference line. Thus, if the structure is a flat wall the first surface is flat. If the structure is a corner wall, the first surface is flat with a bend that corresponds to the corner.

The platform may have a substantially flat surface. The platform may extend along a length of the alignment member and define the reference line. Preferably, the platform extends the whole length of the alignment member. A platform is configured to allow the alignment member to fully or partially support the weight of objects being aligned. The platform may be a second surface of the body that is perpendicular to the first surface of the body. Preferably both surfaces share a common corner. Alternatively the platform may be a flange that extends perpendicularly from the body with reference to the first surface.

The alignment member may be length-adjustable (e.g. telescopic). This will enable the alignment member to be adapted for use on structures with various lengths, for example walls of various lengths. The alignment member may be formed of a material that may be easily cut. This will allow the length of the alignment member to be easily shortened by cutting. The alignment member may be formed of at least one of:—PVC; plastics; aluminum; steel; stainless steel or any other suitable material; or a combination thereof.

A person may press the alignment member against the structure, such as, for example, a wall, and hold it in a desired orientation, against the structure, by applying pressure to the alignment member. However, connecting the alignment member by such means may prove difficult as the person must maintain their hold on the alignment member while aligning objects thereto. The person, therefore, is left with only one free hand to align the objects with the alignment member.

Therefore, the alignment device may further comprise a connecting means to allow the alignment member to be connected to a structure. The connecting means may be capable of detachably or undetachably connecting the alignment member to a structure. This connecting means will permit an alignment member, which has been orientated into a desired orientation, to be either detachably or undetachably connected to a structure in that orientation.

The connecting means may be attachable to or attached to the alignment member. Preferably the connecting means is attached to the alignment member. Most preferably the connecting means is detachably attachable to or detachably attached to the alignment member. This will allow connecting means to be replaced. A connecting means may want to be replaced if it is worn and is no longer capable to connecting the alignment member to a structure. Most desirably the connecting means is detachably attachable to or detachably attached to the body of the alignment member, preferably to the first surface.

The connecting means may be a fastener means (such as one or more nails or screws) that can attach the alignment member to the structure by embedding the fastener means in the structure and attaching the fastener means to the alignment member. One or more apertures suitable for receiving the fastener means may be provided in the alignment member (preferably in the body of the alignment member). A fastener may be provided with a head portion located at one end of a shank portion. The shank portion may be configured to pass through the apertures and into the structure, whilst the head portion configured not to be able to pass through the aperture.

Preferably, the connecting means is an adhesive. More preferably, the connecting means is one or more adhesive strip(s) capable of adhering the alignment member to a structure. This will permit the alignment member to be attached to a structure without the aid of nails or screws. The absence of nails and screws ensures that the, structural strength, or vulnerability of the structure to dampness, is not compromised by the connection of the alignment device thereto.

In one embodiment the connecting means is a single adhesive strip that is capable of adhering the alignment member to a structure. The adhesive strip may be an elongate adhesive strip. The adhesive strip may extend the length of the alignment member. This will ensure that the whole length of the alignment member may be connected to a structure.

In another embodiment the connecting means is a plurality of adhesive strips, preferably distributed along the length of the alignment member. This will allow a person to select the strength of adhesion by enabling the person to use some or all of the plurality of adhesive strips when connecting the alignment member a structure. A stronger connection is provided by using more of the plurality of adhesive strips to connect the alignment member to the structure. The person may also choose to have stronger adhesion in different portions of the alignment member by using more of the adhesive strips in this portion. The availability of a plurality of adhesive strips may also allow the alignment member to be reused if the person uses only some of the plurality of adhesive strips to connect the alignment member to the structure. The alignment member may be reused until all the adhesive strips have been used and the strips no longer provide sufficient adherence.

The connecting means may comprise any adhesion known to the skilled person, for example, Polyvinyl Acetate, double sided tape (such as double sided urethane foam tape or double sided polythene foam tape), pressure-sensitive adhesive, contact adhesives or glue (such as hot glue). The double sided tape may comprise a modified acrylic adhesive.

The connecting means may further comprise one or more tags capable of protecting the whole or part of the connecting means when the whole or part of the connecting means is not in use. The one or more tags may cover the whole or part of the connecting means, being peeled off the connecting means in order to permit use of the whole or part of the connecting means. The one or more adhesive strips may further comprise one or more tags capable of protecting some or all of the adhesive strips when some or all of the adhesive strips are not in use. The one or more tags may be peeled from the one or more adhesive strips to expose adhesive and permit use of the one more adhesive strips.

The use of a single tag provides for fast removal of the one or more tags from the connecting means.

The use of a plurality of tags will allow the person to select the level of adherence by removing the desired number of tags, while the part of the connecting means not used remains protected by the remaining tags. The alignment member may be reused until all the tags have been removed and the connecting means is no longer capable of connecting the alignment member to a structure.

The one or more tags may be shaped complimentary to the shape of the connecting means. This will ensure maximum protection for the connecting means.

The one or more tags may further comprise a griping aid that will enable a tag to be easily gripped and pulled from the connecting means. The gripping aid may be in the form of a tab which extends from the tag. Preferably, the tag is shaped so as to further provide a tab in the form of an elongate strip.

The gripping aid may be arranged to enable the tag to be easily gripped and pulled from the connecting means while the alignment member is being connected to a structure. The gripping aid may extend away from the alignment member to allow it to be easily gripped by a person. Preferably the gripping aid will extend vertically away from the alignment member. The gripping aids are more visible to the person when they extend vertically away from the alignment member and therefore may be more easily gripped and pulled.

A handle member may be further provided, which is capable of holding the measuring mechanism in a position which allows an output reading on the measuring mechanism to be easily read by a person.

The measuring mechanism may be pivotable about an axis. The measuring mechanism may be pivotable about an axis as it is retained by the alignment mechanism. The pivotable measuring mechanism may be releasably fixed at a chosen angle relative to the alignment member. The chosen angle may correspond to a desired angle of orientation of the alignment member. Such a pivotable measuring mechanism will allow the alignment member to be accurately orientated to any desired angle. For example if the measuring mechanism is a spirit level and if it is desired to orientate the alignment member to a 45 degree angle, then pivoting the spirit level and fixing it at a 45 degree angle will ensure that the spirit level will give a level reading when the alignment member has been orientated to a 45 degree angle.

The measuring mechanism may further comprise an alarm mechanism to signal a desired measurement. For example, the alarm mechanism may signal the centre of a wall or may signal when the alignment member has been orientated to a desired orientation. The alarm mechanism may comprise at least one of a means of providing a sound, visual or vibration signal.

The measuring mechanism may further comprise a mechanism capable of providing a second reference line. The mechanism capable of providing a second reference line may be capable of providing a second reference line orientated at any angle. The mechanism capable of providing a second reference line may be pivotably mounted so that the mechanism is capable of providing a second reference line orientated at any angle. The mechanism suitable for providing a second reference line may be a laser. The laser may be arranged to provide a reference line orientated at any angle, for example, the laser may be pivotable or pivotably mountable. A mechanism suitable for providing a second reference line allows the alignment device to provide both a horizontal and vertical reference alignment line. For example, if the alignment device was used to aid the alignment of tiles, the alignment member may be used to ensure horizontal alignment of the tiles and the mechanism capable of providing a second reference line may be used to provide a vertical reference line, thereby also providing for the vertical alignment of the tiles.

According to a second aspect of the present invention there is provided a measuring mechanism suitable for measuring orientation, and adapted to be retained by an alignment member.

An alignment member is any member that may be arranged to provide a reference line. The alignment member may, for example, be an elongate member comprising or consisting of, plastic, metal, wood or any other suitable material.

The measuring mechanism may have any or all of the features of the measuring device of the first aspect of the present invention. For example, the measuring mechanism may comprise a carriage member, wherein the carriage member is suitable for positioning within a recessed area of the alignment member so that the alignment member retains the measuring mechanism.

The carriage member may be arrangeable within the recessed area of the alignment member so that the measuring mechanism can be moved along a length of the alignment member.

The measuring mechanism may comprise at least two carriage members.

The measuring mechanism may be a mechanism for measuring the orientation of the alignment member relative to the vertical.

The measuring mechanism may be a mechanism for measuring the orientation of the alignment member relative to the horizontal.

The measuring mechanism may be a mechanism for measuring the orientation of the alignment member relative to the vertical and horizontal.

The measuring mechanism may be at least one of a spirit level, a digital level, or a measuring device that uses an infra red sensor, ultrasound, or a light emitting diode-based transmitter. Preferably the measuring mechanism is a spirit level.

The measuring mechanism may be pivotable about an axis. The measuring mechanism may be pivotable about an axis as it is retained by the alignment mechanism. The pivotable measuring mechanism may be releasably fixed at a chosen angle. The chosen angle may correspond to a desired angle of orientation of the alignment member. Such a pivotable measuring mechanism will allow the alignment member to be accurately orientated to any desired angle. For example, if the measuring mechanism is a spirit level and if it is desired to orientate the alignment member to a 45 degree angle, then pivoting the spirit level and fixing it at a 45 degree angle will ensure that the spirit level will give a level reading when the alignment member has been orientated to a 45 degree angle.

The measuring mechanism may further comprise a mechanism capable of measuring length.

The measuring mechanism may further comprise a mechanism capable of determining the centre of a structure. Preferably, the measuring mechanism may further comprise a mechanism capable of determining the centre of a structure to which the alignment device is connected. Such a feature is useful when the alignment device is used to aid in the tiling of a wall. In certain cases it is preferable to begin tiling at the centre of a wall so that a symmetrical tile pattern will be achieved or to avoid the requirement for a difficult tile cut at the wall's edge.

The measuring mechanism may further comprise an alarm mechanism to signal a desired measurement. For example, the alarm mechanism may signal the centre of a wall or may signal when the alignment member has been orientated to a desired orientation. The alarm mechanism may comprise at least one of a means of providing a sound, visual or vibration signal.

The measuring mechanism may further comprise a mechanism capable of providing a second reference line. The mechanism capable of providing a second reference line may be capable of providing a second reference line orientated at any angle. The mechanism capable of providing a second reference line may be pivotably mounted so that the mechanism is capable of providing a second reference line orientated at any angle. The mechanism suitable for providing a second reference line may be a laser. The laser may be arranged to provide a reference line orientated at any angle, for example, the laser may be pivotable or pivotably mountable. A mechanism suitable for providing a second reference line allows the device to provide both a horizontal and vertical reference alignment line. For example, if the alignment device was used to aid the alignment of tiles the alignment member may be used to ensure horizontal alignment of the tiles, the mechanism capable of providing a second reference line may be used to provide a vertical reference line thereby also providing for the vertical alignment of the tiles.

According to a third aspect of the present invention there is provided an alignment member adapted to retain a measuring mechanism.

The alignment member may have some or all of the features of the alignment member of the first aspect of the present invention. For example, the alignment member may comprise a recessed area with a retaining member that defines an access aperture (female) to facilitate the engagement of the measuring mechanism and alignment member such that the measuring mechanism is retained by the alignment member. The recessed area and access aperture may be an elongate recess area with an aperture that runs the length, or a portion thereof, of the alignment mechanism, thereby forming a track.

The alignment member may be suitable for aligning objects to be attached to a structure.

The alignment member may further comprise a connecting means capable of connecting the alignment member to a structure.

The alignment member may be arranged to retain the measuring mechanism in a manner that allows the measuring mechanism to be moved along a length of the alignment member.

The alignment member may be arranged to retain the measuring mechanism such that the alignment member releasably retains the measuring mechanism.

The alignment member may define a track which guides the measuring mechanism as it is moved along the length of the alignment member.

According to a fourth aspect of the present invention there is provided a kit comprising,
 at least one alignment member,
 at least one measuring mechanism capable of measuring the orientation of an alignment member, and
 wherein the alignment member is capable of retaining the measuring mechanism.

The alignment member may have some or all of the features of the alignment members of the first or third aspects of the present invention.

The measuring mechanism may have some or all of the features of the measuring device of the first or second aspect of the present invention.

The kit may comprise a plurality of alignment members. Some or all of the plurality of alignment members may be of various lengths, shapes, aspects designs and/or sizes.

The kit may further comprise one or more connecting means capable of connecting the alignment member to a structure.

The alignment member may be arranged to retain the measuring mechanism in a manner which allows the measuring mechanism to be moved along a length of the alignment member.

The alignment member may be arranged to releasably retain the measuring mechanism.

These and other features will be better understood with reference to the followings Figures which are provided to assist in an understanding of the teaching of the invention.

BRIEF DESCRIPTION OF THE DRAWINGS

The present invention will now be described with reference to the accompanying drawings in which.

DETAILED DESCRIPTION OF THE DRAWINGS

The invention will now be described with reference to an exemplary alignment device which is provided to assist in an understanding of the teaching of the invention.

Figure 1:
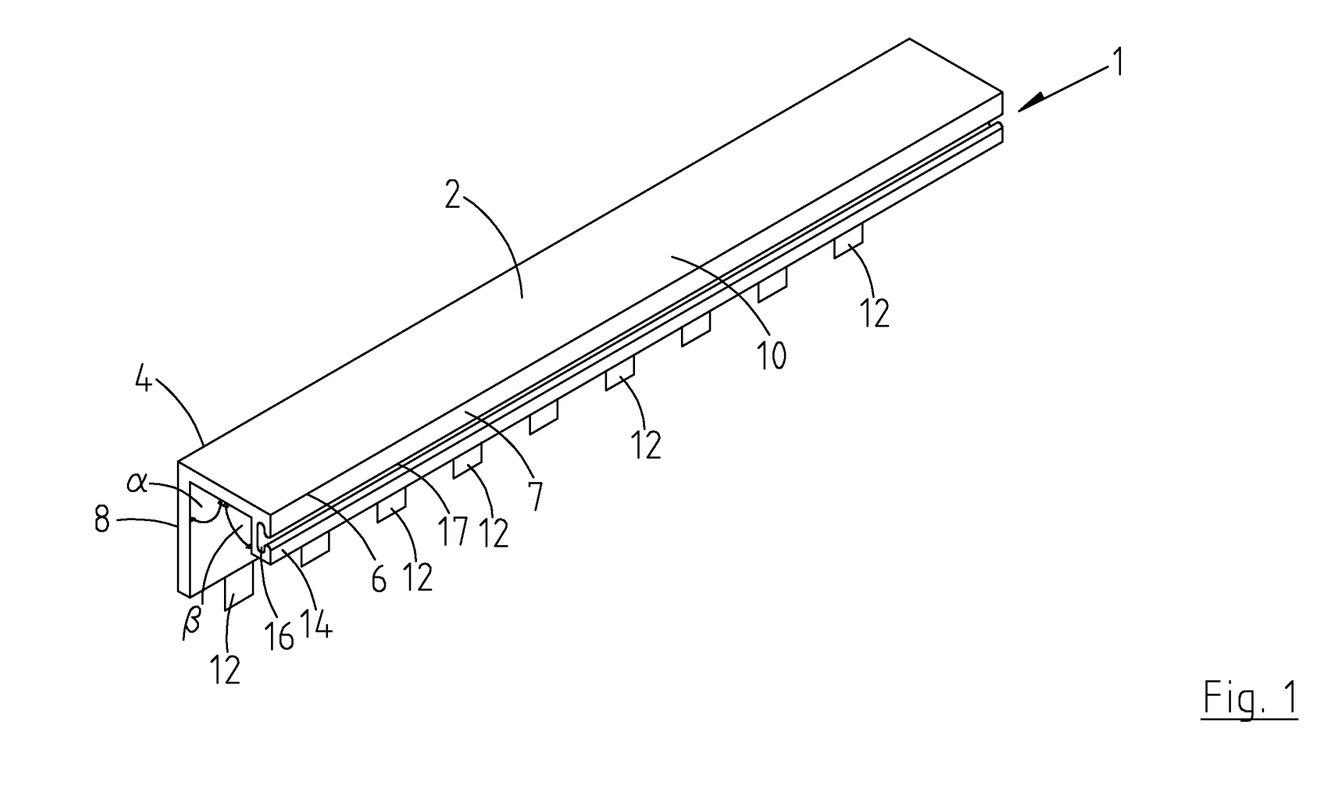
FIG. 1 shows a perspective view of an embodiment of an alignment member.

FIG. 1 shows a perspective view of an embodiment of an alignment member 1. The alignment member 1 has a platform 2 having a flat upper surface 10. The platform 2 has a back end 4 and a front end 6. A first surface 8 is located at the back end 4 of the platform 2. A retaining member 7 is located at the front end 6 of the platform 2.

First surface 8 is provided by an "I" shaped elongate member with a length equal to the length of the platform 2. The "I" shaped elongate member projects downward of the platform 2 and is orientated to form a right angle "α" with the platform 2. As shown in FIG. 1, a plurality of evenly spaced tabs 12 project vertically from the first surface 8 to above the upper surface 10 of the platform 2.

The retaining member 7 also projects downward of the platform 2 and is orientated to form a right angle "β" with the platform 2. The retaining member 7 is composed of an elongate "C" shaped member 14 which has a length equal to the length of the platform 2. The elongate "C" shaped member 14 defines an access aperture 17 which provides access to a track 16, from any point along the member's length. The track 16 is open ended.

Figure 2:
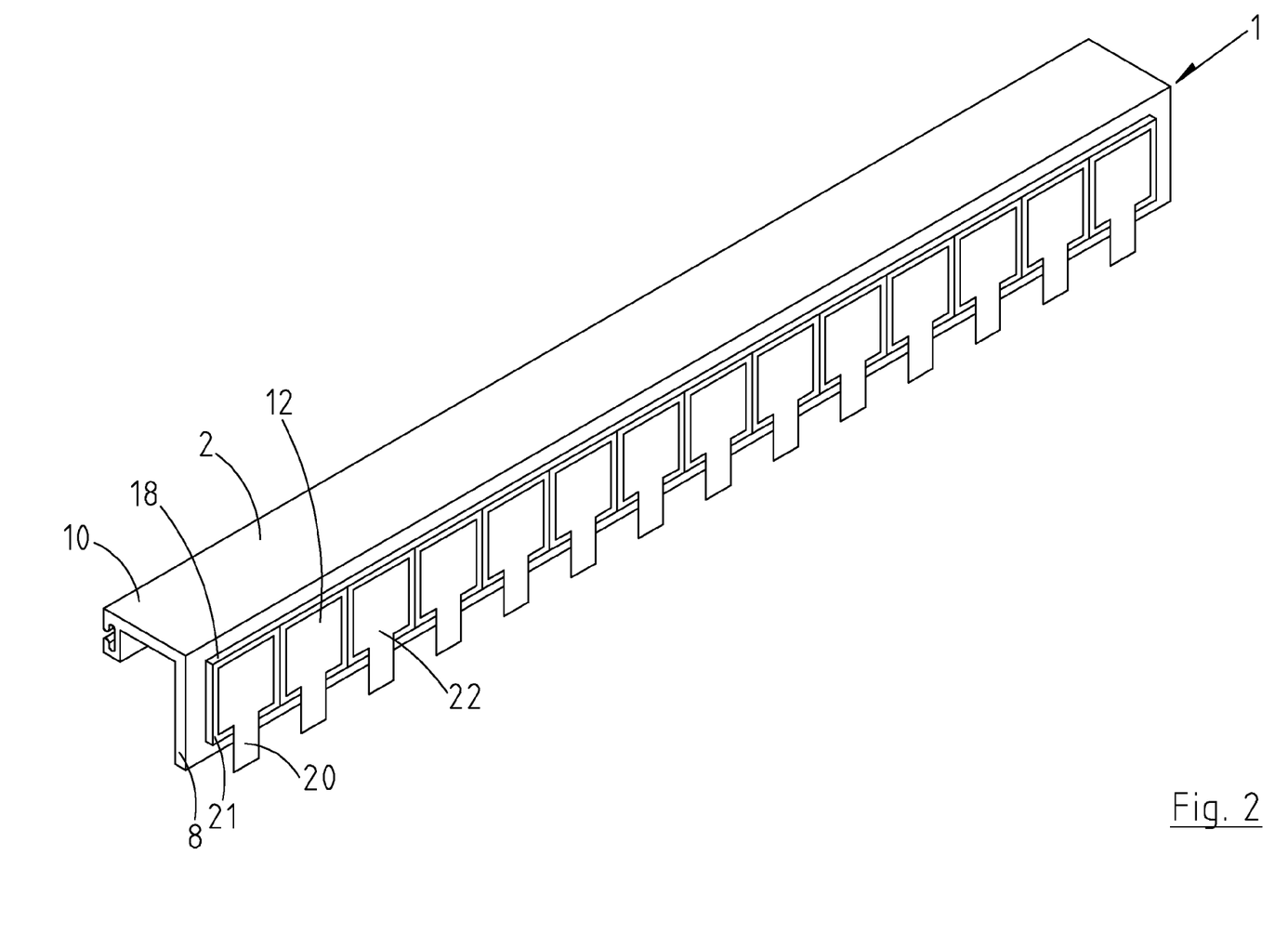
FIG. 2 shows an alternative perspective view of the alignment member of FIG. 1.

FIG. 2 shows an alternative perspective view of the alignment member 1 of FIG. 1. As shown in FIG. 2 the first surface 8 is further provided with an adhesive strip 18 which has an adhesive surface 21. The adhesive strip 18 is arranged on an outer surface 20 of the first surface 8. The adhesive strip 18 may be used to adhere the alignment member 1 to a structure such as a wall.

A plurality of tags 22 cover the adhesive surface 21 of the adhesive strip 18. These tags 22 will protect some or all of the adhesive surface 21 of the adhesive strip 18, when some or all of the adhesive strip 18 is not in use. Each of the plurality of tags 22 further comprises a gripping aid in the form of a tab 12. The tabs 12 are arranged to extend beyond the first surface 8, so that they can be easily gripped and pulled.

One or more of the tags 22 may be removed to expose some or all of the adhesive surface 21 of the adhesive strip 18. To remove a tag 22 the corresponding tab 12 is gripped and pulled. As the tab 12 is pulled the tag 22 will peel off the surface of the adhesive strip 18 to expose the adhesive surface 21 that lies beneath. Any number of tags 22 may be removed. The more tags 22 that are removed the more of the adhesive surface 21 that is exposed and the greater the adherence provided by the adhesive strip 18. The alignment member 1 may be reused until all the tags 22 have been removed and the adherence of the adhesive strip 18 is less than the adherence required to adhere the alignment member 1 to a structure.

Figure 3:
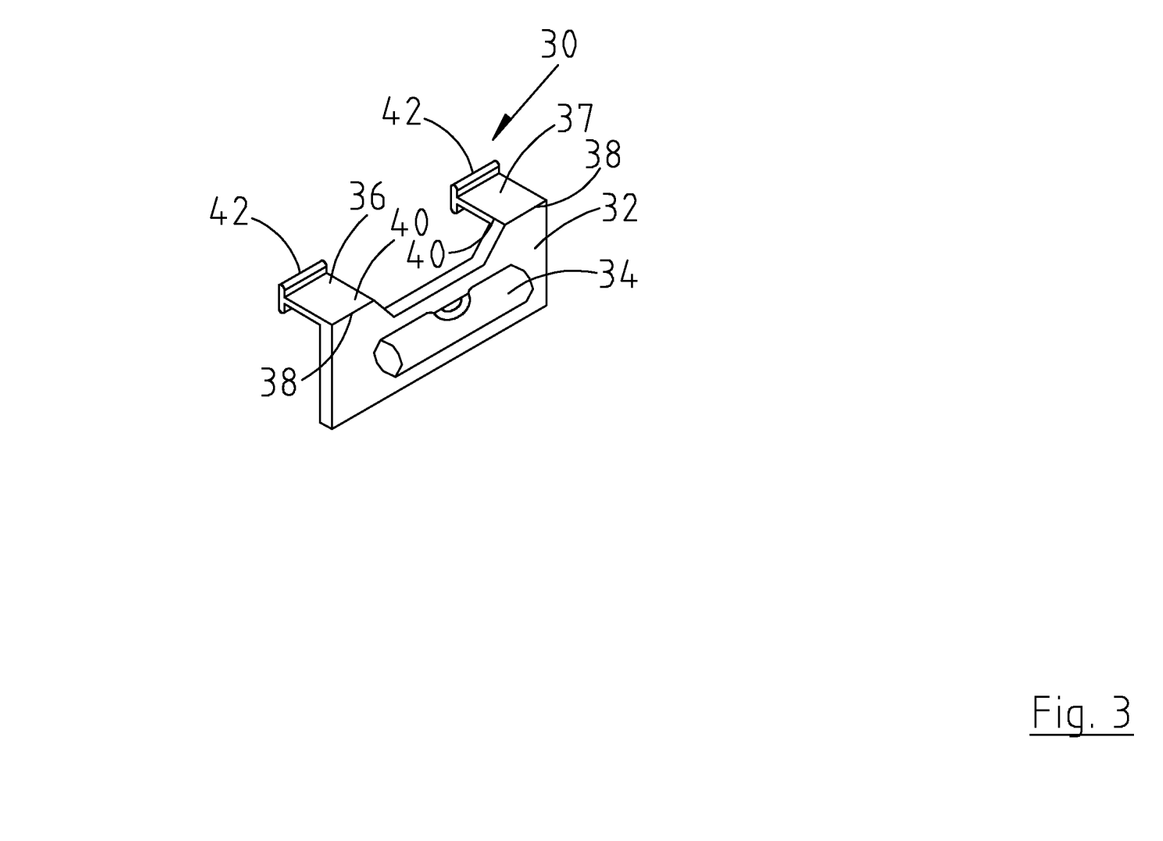
FIG. 3 shows a perspective view of an embodiment of a measuring mechanism.

FIG. 3 shows a perspective view of an embodiment of a measuring mechanism 30. The measuring mechanism 30 comprises a handle member 32 which holds a spirit level 34. A first and second carriage member, 36 and 37 respectively, are located at an end 38 of the handle member 32. Both the first and second carriage members 36,37 are in alignment with one another and they each extend, at a right angle, from the handle member 32, at end 38.

Each of the first and second carriage members 36, 37 comprise a connector 40 which connects a track engagement element 42 to the handle member 32. The track engagement element 42 is shaped complimentary to the cross-section of track 16 defined in the retaining member 7 of the alignment member 1 of FIGS. 1 and 2.

Figure 4:
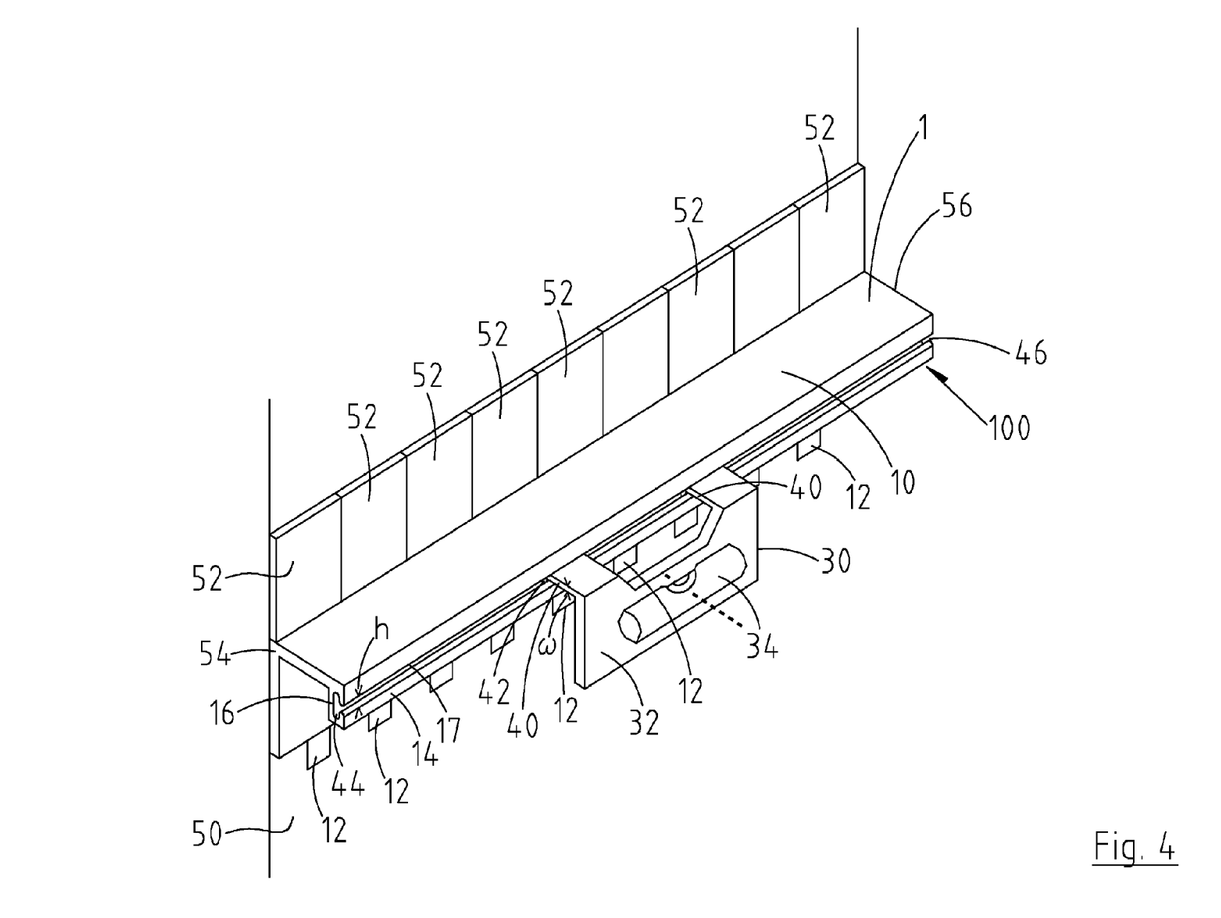
FIG. 4 shows a perspective view of an alignment device which comprises the alignment member of FIGS. 1 and 2 and the measuring mechanism of FIG. 3, in use.

FIG. 4 shows a perspective view of an alignment device 100 in use. The alignment device is connected to a wall 50 and is used to ensure that tiles 52 being applied to the wall 50 will align in a horizontal alignment.

The alignment device 100 comprises the alignment member 1 of FIGS. 1 and 2 and the measuring mechanism 30 of FIG. 3. The measuring mechanism 30 is retained by the alignment member 1. The track engagement elements 42 of the measuring mechanism 30 have been positioned into the track 16 of retaining member 14 so that the alignment member 1 retains the measuring mechanism 30. As shown in the drawing, each of the connectors 40 extend from within the track 16, through the access aperture 17 of the alignment member 1, so that the handle member 32 hangs outside the track 16. The width "w" of the connector 40 is slightly less than the height "h" of the access aperture 17 to allow the measuring mechanism 30 to move freely along the track 16.

To arrive at the set-up of FIG. 4 the track engagement elements 42 of the measuring mechanism 30 are first positioned into the track 16, so that the alignment member 1 retains the measuring mechanism 30. This may be achieved by pressing the track engagement elements 42 through the access aperture 17 of the alignment member 1, so that each of the track engagement elements 42 sit into the track 16. Alternatively, the track engagement elements 42 may be slid, one after the other, through an open end 44, 46 of the retaining member 14 so that the track engagement elements 42 each sit into the track 16.

Once the measuring mechanism 30 has been positioned such that the alignment member 1 retains the measuring mechanism 30, the alignment member 1 may then be connected to the wall 50. As shown in FIG. 4, the alignment member 1 is connected to the wall 50 so that the upper surface 10 of the platform 2 of the alignment member 1 is horizontal.

To connect the alignment member 1 to wall 50 it is preferred to connect the alignment member 1 portion by portion. The person begins at a first portion of the alignment member 1, located proximate to a first end 54 of the alignment member 1. The person will remove one or more of the tags located proximate to that first portion by pulling on one or more of the vertically extending tabs 12. Removing the one or more tags will expose the adhesive surface of the part of the adhesive strip that is located proximate to the first portion of the alignment member 1. FIG. 4 shows that only some of the total number of tags have been removed, the tabs 12 of the remaining tags are shown to extend vertically above the upper surface 10 of the platform 2 of the alignment member 1.

Once the desired number of tags have been removed, the measuring mechanism 30 is then slid along the track 16 until it is located within the first portion of the alignment member 1. Before the first portion of the alignment member is adhered to the wall using the exposed adhesive surface of the adhesive strip, it is first arranged into a horizontal orientation using the spirit level 34 of the measuring mechanism 30. As the measuring mechanism 30 is retained by the alignment member 1, orientating the first portion of the alignment member into a desired orientation (i.e. horizontal) may be achieved using just one-hand. Once in a horizontal orientation the first portion of the alignment member is pressed against the wall so that the exposed adhesive surface of the adhesive strip touches the wall 50 and connects the first portion of the alignment member 1 to the wall 50.

Following this the person removes one or more of the tags on a part of the adhesive strip located proximate to a second portion of the alignment member 1. The person slides the measuring mechanism 30 along the track 16 until it is located within that second portion of the alignment member 1. Before the second portion of the alignment member is adhered to the wall 50, it is first arranged into a horizontal orientation using the spirit level 34 on the measuring mechanism 30. Once in a horizontal orientation the second portion of the alignment member 1 is pressed against the wall 50 so that the exposed adhesive surface of the adhesive strip touches the wall 50 and connects the second portion of alignment member 1 to the wall 50.

The person will repeat the above steps for each portion of the alignment member until the whole length of the alignment member 1 has been arranged into a horizontal orientation and adhered to the wall 50. Once the whole length of the alignment member 1 has been arranged into a horizontal orientation and adhered to the wall 50, the alignment device 100 is ready for use, as is illustrated in FIG. 4.

During such use, as each tile 52 is applied to the wall 50 it is aligned with the upper surface 10 of the platform 2 of the alignment member 1 before being adhered to a wall 50 using a tile adhesive. Before the tile adhesive dries the alignment member 1 may be required to support the weight of the tiles 52 on the upper surface 10 of the platform 2. Therefore, the adherence of the adhesive strip should be sufficient such that the alignment member does not fall away from the wall 50 under the weight of the tiles 52. Increased adherence may be achieved by removing additional tags. Removing additional tags will allow more of the adhesive surface of the adhesive strip to be used in connecting the alignment member 1 to the wall 50.

The alignment member 1 is usually made from PVC or plastics to allow it to be easily cut to a suitable length, e.g. to the length of a wall, however, any other suitable material may be used. It is preferred to manufacture the alignment member 1 by means of extrusion, to ensure that the alignment member will have a uniform linear profile, however, any suitable means of manufacturing may be used.

It will be understood that what has been described herein is an exemplary embodiment an alignment device. While the present invention has been described with reference to an exemplary arrangement it will be understood that it is not intended to limit the teaching of the present invention to such arrangements as modifications can be made without departing from the spirit and scope of the present invention. In this way it will be understood that the invention is to be limited only insofar as is deemed necessary in the light of the appended claims.

Similarly the words comprises/comprising when used in the specification are used to specify the presence of stated features, integers, steps or components but do not preclude the presence or addition of one or more additional features, integers, steps, components or groups thereof.

The invention claimed is:

1. An alignment device comprising:
    an alignment member;
    a measuring mechanism for measuring the orientation of the alignment member, the measuring mechanism being retained by the alignment member in a manner which allows the measuring mechanism to be moved along the alignment member, the measuring mechanism further being pivotable about an axis and releasably fixed at a chosen angle;
    adhesive provided on the alignment member for operably coupling the alignment member to a structure; and
    a plurality of removable tags covering the adhesive, configured to facilitate reuse of the alignment device.

2. The alignment device according to claim 1, wherein the alignment member further comprises a guide mechanism configured to guide the measuring mechanism as it is moved along the alignment member.

3. The alignment device according to claim 2, wherein the guide mechanism provides an element for the alignment member to retain the measuring mechanism.

4. The alignment device according to claim 2, wherein the guide mechanism is a track.

5. The alignment device according to claim 1, wherein the measuring mechanism is releasably retained by the alignment member.

6. The alignment device according to claim 1, wherein the alignment member further comprises an access aperture configured to facilitate the engagement of the measuring mechanism and alignment member.

7. The alignment device according to claim 6, wherein the access aperture is an elongate aperture that runs the length of the guide mechanism.

8. The alignment device according to claim 6, wherein the access aperture is defined by the guide mechanism of the alignment member.

9. The alignment device according to claim 1, wherein the alignment member comprises a platform.

10. The alignment device according to claim 1, wherein the alignment member comprises a flange.

11. The alignment device according to claim 10, wherein the alignment member comprises a flange and a platform and the flange and the platform are arranged at a right angle to one another.

12. The alignment device according to claim 1 wherein the adhesive is provided by one or more adhesive strips adhering the alignment member to the structure.

13. The alignment device according to claim 12, wherein the adhesive is provided by a single adhesive strip.

14. The alignment device according to claim 12, wherein the connecting element is provided by a plurality of adhesive strips.

15. The alignment device according to claim 1, wherein each tag comprises a griping aid that will enable the tag to be easily gripped and pulled.

16. The alignment device according to claim 15, wherein the gripping aid is in the form of a tab which extends from the tags.

17. The alignment device according to claim 1, wherein the measuring mechanism is configured for measuring at least one of orientation and/or length.

18. The alignment device according to claim 17, wherein the measuring mechanism is configured for measuring the orientation of the alignment member.

19. The alignment device according to claim 1, wherein the measuring mechanism is any one or a combination of those selected from the group consisting of a spirit level;
a digital level device;
a measuring device that uses an infrared sensor, ultra sound or a light omitting diode-based transmitter.

20. The alignment device according to claim 1, wherein the measuring mechanism further comprises a mechanism providing a second reference line.

21. The alignment device according to claim 20, wherein the mechanism providing a second reference line is pivotably mounted so that the mechanism provides the second reference line orientated at any angle.

22. The alignment device according to claim 20, wherein the mechanism providing a second reference line is a laser.

23. A kit comprising:
at least one alignment device as claimed in claim 1.

24. The kit according to claim 23, wherein the kit comprises a plurality of alignment members.

25. The kit according to claim 24, wherein some or all of the plurality of alignment members are of various lengths, shapes, aspects designs and/or sizes.

26. The kit according to claim 23, wherein the kit further comprises one or more connecting elements capable of connecting the alignment member to a structure.

27. An alignment device as claimed in claim 1, wherein the alignment member comprises a first portion from which, in use, the one or more tags are removable to expose adhesive on the first portion, the device being configured such that the first portion is moveable into a desired orientation using the measuring mechanism as a reference.

28. An alignment device as claimed in claim 27, wherein the adhesive has a strength sufficient to adhere the first portion of the alignment member to the structure.

29. An alignment device as claimed in claim 28, wherein the alignment device comprises a second portion, one or more tags being provided at least proximate to the second portion and being removable to expose adhesive on the second portion.

30. An alignment device as claimed in claim 29, wherein the second portion is configured to be secured to the structure.

31. An alignment device as claimed in claim 1, wherein the measuring mechanism is movable along the alignment member so as to permit a measurement of the orientation of different portions of the alignment member.

32. An alignment device comprising:
an alignment member;
a measuring mechanism for measuring the orientation of the alignment member, the measuring mechanism being retained by the alignment member;
adhesive provided on the alignment member for operably coupling the alignment member to a structure;
a plurality of removable tags covering the adhesive, configured to facilitate reuse of the alignment device; and
the measuring mechanism further comprises an alarm mechanism to signal a desired measurement.

33. The alignment device according to claim 32, wherein the alignment member further comprises a guide mechanism configured to guide the measuring mechanism as it is moved along the alignment member.

34. The alignment device according to claim 33, wherein the guide mechanism provides an element for the alignment member to retain the measuring mechanism.

35. The alignment device according to claim 33, wherein the guide mechanism is a track.

36. The alignment device according to claim 32, wherein the alignment member further comprises an access aperture configured to facilitate the engagement of the measuring mechanism and alignment member.

37. The alignment device according to claim 32, wherein the alignment member comprises a flange and a platform and the flange and the platform are arranged at a right angle to one another.

38. The alignment device according to claim 32 wherein the adhesive is provided by one or more adhesive strips adhering the alignment member to the structure.

39. The alignment device according to claim 32, wherein each tag comprises a gripping aid that will enable the tag to be easily gripped and pulled.

40. The alignment device according to claim 32, wherein the measuring mechanism is configured for measuring at least one of orientation and/or length.

41. The alignment device according to claim 32, wherein the measuring mechanism is pivotable about an axis.

42. The alignment device according to claim 41, wherein the pivotable measuring mechanism can be releasably fixed at a chosen angle.

43. The alignment device according to claim 32, wherein the measuring mechanism is any one or a combination of those selected from the group consisting of; a spirit level;
- a digital level device;
- a measuring device that uses an infrared sensor, ultra sound or a light omitting diode-based transmitter.

* * * * *